US012699455B2

(12) United States Patent
Qi et al.

(10) Patent No.: US 12,699,455 B2
(45) Date of Patent: Aug. 4, 2026

(54) HAPTIC PANEL AND DISPLAY APPARATUS

(71) Applicants: Beijing BOE Technology Development Co., Ltd., Beijing (CN); BOE Technology Group Co., Ltd., Beijing (CN)

(72) Inventors: Dexing Qi, Beijing (CN); Yongchun Tao, Beijing (CN); Yingzi Wang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 274 days.

(21) Appl. No.: 18/712,025

(22) PCT Filed: Jul. 28, 2023

(86) PCT No.: PCT/CN2023/110026
§ 371 (c)(1),
(2) Date: May 21, 2024

(87) PCT Pub. No.: WO2025/025017
PCT Pub. Date: Feb. 6, 2025

(65) Prior Publication Data
US 2026/0161230 A1 Jun. 11, 2026

(51) Int. Cl.
*G06F 3/01* (2006.01)
*G06F 1/16* (2006.01)
*G06F 3/041* (2006.01)

(52) U.S. Cl.
CPC ............ *G06F 3/016* (2013.01); *G06F 1/1607* (2013.01); *G06F 3/04164* (2019.05); *G06F 2203/014* (2013.01)

(58) Field of Classification Search
CPC .... G06F 3/016; G06F 1/1607; G06F 3/04164; G06F 2203/014
See application file for complete search history.

(56) References Cited

U.S. PATENT DOCUMENTS

| | | | | |
|---|---|---|---|---|
| 2003/0227581 A1* | 12/2003 | Sung | ................. | G02F 1/133308 349/58 |
| 2010/0117809 A1* | 5/2010 | Dai | ......................... | G06F 3/041 345/173 |
| 2018/0081441 A1 | 3/2018 | Pedder et al. | | |

FOREIGN PATENT DOCUMENTS

| | | |
|---|---|---|
| CN | 207867453 U | 9/2018 |
| CN | 109947244 A | 6/2019 |
| CN | 213122903 U | 5/2021 |
| CN | 113220166 A | 8/2021 |

(Continued)

*Primary Examiner* — Omeed Alizada
(74) *Attorney, Agent, or Firm* — ArentFox Schiff LLP; Michael Fainberg

(57) ABSTRACT

Embodiments of the present disclosure provide a haptic panel and a display apparatus. The haptic panel includes: a display module; a cover plate on a light exiting side of the display module, wherein a size of the cover plate is larger than a size of the display module; a plurality of piezoelectric devices, arranged on the same side of the cover plate as the display module, and at least arranged on an opposite side of the display module; a supporting layer, arranged on the same side of the cover plate as the piezoelectric devices and at least arranged on a side of the display module.

20 Claims, 9 Drawing Sheets

(56)        References Cited

FOREIGN PATENT DOCUMENTS

CN          116360631  A     6/2023
KR      10-2017-0082001  A     7/2017

* cited by examiner

HAPTIC PANEL AND DISPLAY APPARATUS

CROSS-REFERENCE TO RELATED APPLICATIONS

The present disclosure is a National Stage of International Application No. PCT/CN2023/110026, filed on Jul. 28, 2023, all of which is hereby incorporated by reference in its entirety.

TECHNICAL FIELD

The present disclosure relates to the technical field of haptics, in particular to a haptic panel and a display apparatus.

BACKGROUND

Haptics is the focus of today's technology development, and specifically, haptics enables a terminal to interact with a human body through the sense of touch.

SUMMARY

Embodiments of the present disclosure provide a haptic panel and a display apparatus. A specific solution is as follows.

An embodiment of the present disclosure provides a haptic panel, including:

a display module;

a cover plate on a light exiting side of the display module, where a size of the cover plate is larger than a size of the display module;

a plurality of piezoelectric devices, arranged on the same side of the cover plate as the display module, and at least arranged on an opposite side of the display module;

a supporting layer, arranged on the same side of the cover plate as the piezoelectric devices and at least arranged on a side of the display module, where an orthographic projection of the supporting layer on the cover plate and orthographic projections of the piezoelectric devices on the cover plate do not overlap, and at least part of the supporting layer has a plurality of openings that disconnect the supporting layer; and a back frame, having an accommodation space for bearing the display module, and fixedly connected to the supporting layer.

In a possible implementation, in the above haptic panel provided by the embodiment of the present disclosure, the supporting layer is arranged surrounding the display module, and at least a region of the supporting layer adjacent to the piezoelectric devices has the plurality of openings.

In a possible implementation, in the above haptic panel provided by the embodiment of the present disclosure, the cover plate has a pair of long edges which are arranged opposite to each other and a pair of short edges connected with the pair of long edges, and the piezoelectric devices are arranged on sides close to the pair of long edges of the cover plate.

In a possible implementation, in the above haptic panel provided by the embodiment of the present disclosure, the cover plate has a pair of long edges which are arranged opposite to each other and a pair of short edges connected with the pair of long edges, and the piezoelectric devices are arranged on sides close to the pair of short edges of the cover plate.

In a possible implementation, in the above haptic panel provided by the embodiment of the present disclosure, the piezoelectric devices are arranged on a periphery of the cover plate.

In a possible implementation, in the above haptic panel provided by the embodiment of the present disclosure, the openings are arranged in one-to-one correspondence to the piezoelectric devices, a length of each opening in an arrangement direction of the piezoelectric devices is larger than or equal to a length of the piezoelectric device in the arrangement direction of the piezoelectric devices, and the piezoelectric device is arranged in at least part of a space of the opening.

In a possible implementation, in the above haptic panel provided by the embodiment of the present disclosure, a center of the piezoelectric device coincides with a center of a corresponding opening.

In a possible implementation, in the above haptic panel provided by the embodiment of the present disclosure, an orthographic projection of the piezoelectric device on the cover plate and an orthographic projection of the corresponding opening on the cover plate have an overlapping region, and a center of the piezoelectric device does not coincide with a center of the corresponding opening.

In a possible implementation, the above haptic panel provided by the embodiment of the present disclosure further includes a protective layer on a side of the plurality of piezoelectric devices facing away from the cover plate. The protective layer covers a surface of the piezoelectric device facing away from the cover plate and covers a side surface of the piezoelectric device not in contact with the supporting layer, and the protective layer is in contact with the cover plate.

In a possible implementation, in the above haptic panel provided by the embodiment of the present disclosure, a thickness of the supporting layer is larger than a maximum thickness of the protective layer.

In a possible implementation, in the above haptic panel provided by the embodiment of the present disclosure, all side edges of the supporting layer have a plurality of openings that disconnect the supporting layer, and the piezoelectric devices are arranged between the supporting layer and the display module.

In a possible implementation, in the above haptic panel provided by the embodiment of the present disclosure, the number of the openings in each of the side edges of the supporting layer is smaller than the number of the piezoelectric devices.

In a possible implementation, the above haptic panel provided by the embodiment of the present disclosure further includes a protective layer on a side of the plurality of piezoelectric devices facing away from the cover plate. The protective layer covers a surface of the piezoelectric device facing away from the cover plate and covers a side surface of the piezoelectric device, and the protective layer is a closed annulus surrounding the display module.

In a possible implementation, in the above haptic panel provided by the embodiment of the present disclosure, a material of the protective layer is green oil or tri-proof paint.

In a possible implementation, in the above haptic panel provided by the embodiment of the present disclosure, the piezoelectric devices are arranged at positions of a wave crest and/or a wave trough of a mechanical wave that drives the cover plate to vibrate.

In a possible implementation, in the above haptic panel provided by the embodiment of the present disclosure, a material of the supporting layer includes at least one of rubber, foam, sponge, or polydimethylsiloxane.

In a possible implementation, in the above haptic panel provided by the embodiment of the present disclosure, the display module includes a display panel and back light which are laminated on a side of the cover plate facing the back frame.

In a possible implementation, in the above haptic panel provided by the embodiment of the present disclosure, each piezoelectric device includes a first electrode, a piezoelectric layer and a second electrode which are laminated. The first electrodes of all the piezoelectric devices are all grounded, the second electrodes of the piezoelectric devices located on the same side of the display module are electrically connected with the same driving voltage end, and the second electrodes of the piezoelectric devices located on different sides of the display module are electrically connected with different driving voltage ends.

In a possible implementation, the above haptic panel provided by the embodiment of the present disclosure further includes a flexible printed board arranged within the back frame and electrically connected with the display module, and a printed circuit board on an outer side of the back frame. The first electrodes and second electrodes of the piezoelectric devices are electrically connected with the flexible printed board respectively, and the flexible printed board is electrically connected with the printed circuit board through the opening.

In a possible implementation, in the above haptic panel provided by the embodiment of the present disclosure, a structure of each piezoelectric device is a piezoelectric thin film or a piezoelectric ceramic block.

In a possible implementation, in the above haptic panel provided by the embodiment of the present disclosure, the cover plate includes a cover plate on a surface of a display module of a notebook computer, a cover plate on a surface of a vehicle-mounted display module, or a cover plate on a surface of a display module of a mobile terminal.

Correspondingly, an embodiment of the present disclosure further provides a display apparatus, including any one of the haptic panels provided by the embodiments of the present disclosure above.

DETAILED DESCRIPTION

In order to make objectives, technical solutions and advantages of embodiments of the present disclosure clearer, the technical solutions of the embodiments of the present disclosure will be clearly and completely described below with reference to accompanying drawings of the embodiments of the present disclosure. Apparently, the described embodiments are some, but not all, embodiments of the present disclosure. The embodiments of the present disclosure and features in the embodiments may be mutually combined without conflicting. Based on the described embodiments of the present disclosure, all other embodiments obtained by those of ordinary skill in the art without creative work shall fall within the protection scope of the present disclosure.

Unless otherwise defined, technical terms or scientific terms used in the present disclosure should have the ordinary meaning as understood by those of ordinary skill in the art to which the present disclosure pertains. "Include" or "comprise" and similar words used in the present disclosure mean that the element or object appearing before the words covers the elements or objects recited after the word and their equivalents, but do not exclude other elements or objects. The words "connect" or "link" or the like are not limited to physical or mechanical connection, but may include electrical connection, whether direct or indirect. "Inner", "outer", "up", "down" and the like are only used for representing a relative position relationship, and after an absolute position of a described object is changed, the relative position relationship may also be changed accordingly.

It needs to be noted that sizes and shapes of figures in the accompanying drawings do not reflect a true scale, and are only intended to illustrate contents of the present disclosure. In addition, identical or similar reference numbers throughout indicate identical or similar elements or elements with identical or similar functions.

For a vibration-based haptic reproduction device, a working principle thereof is usually to paste a piezoelectric sheet, a linear motor or a piezoelectric thin film on a substrate and apply pulse excitation to realize virtual buttons and other touch control functions. In the solution using the linear motor, because of the small mass of the linear motor, it is difficult to drive a large-size screen module (e.g., a vehicle-mounted display) to generate vibrations and realize a haptic feedback function.

Figure 8:
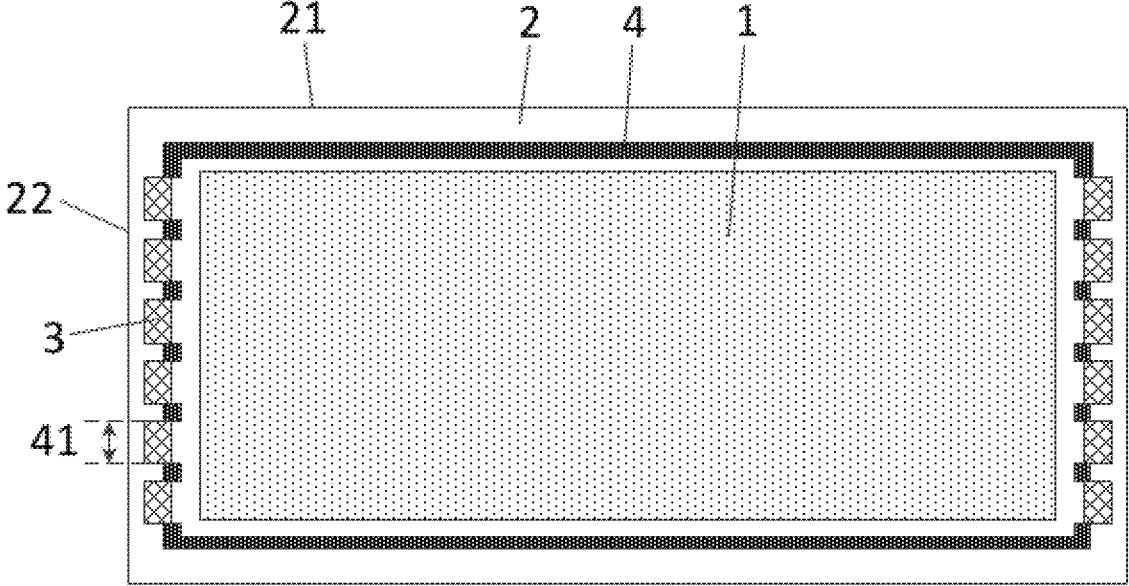
FIG. 8 is a schematic plan view of a haptic panel provided by an embodiment of the present disclosure.
Figure 9:
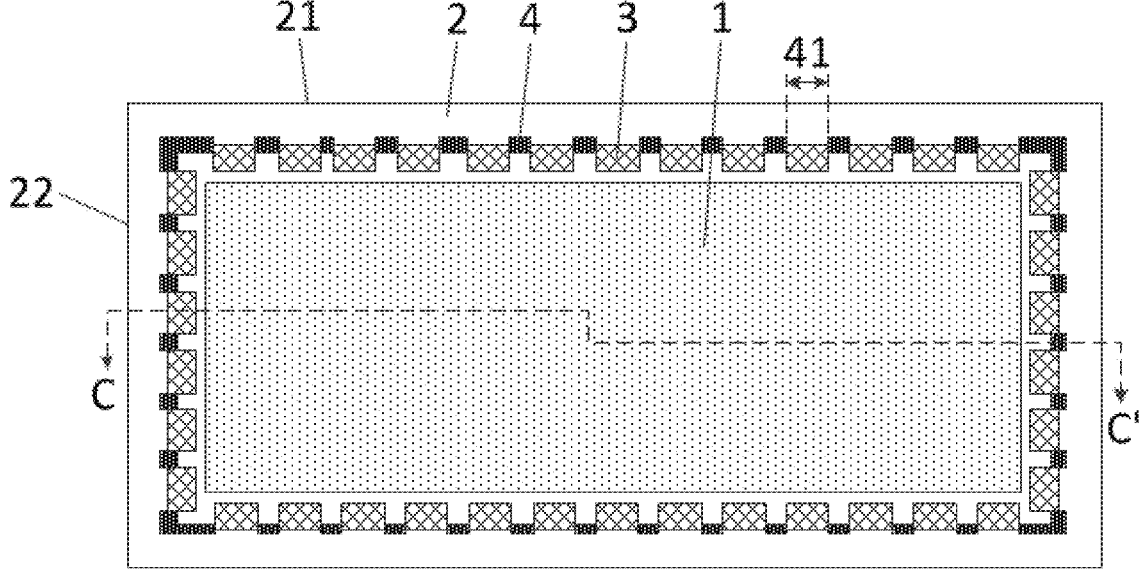
FIG. 9 is a schematic plan view of a haptic panel provided by an embodiment of the present disclosure.
Figure 10:
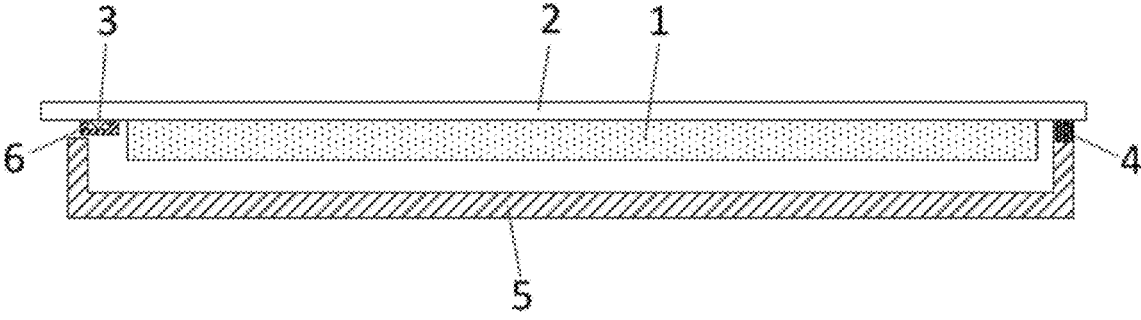
FIG. 10 is a schematic sectional view in a direction CC' in FIG. 9.
Figure 13:
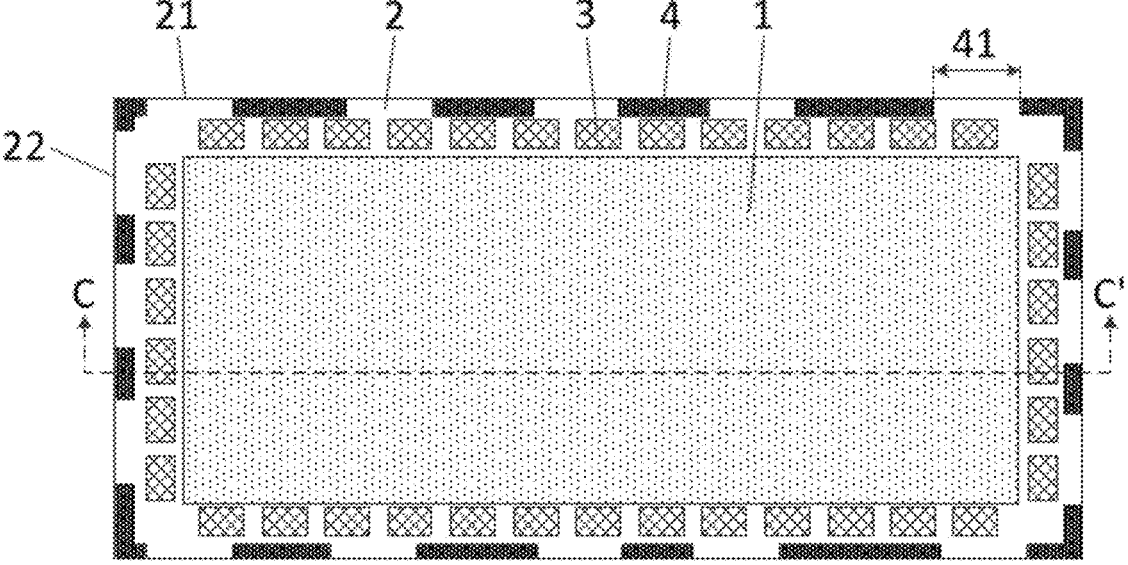
FIG. 13 is a schematic plan view of a haptic panel provided by an embodiment of the present disclosure.
Figure 14:
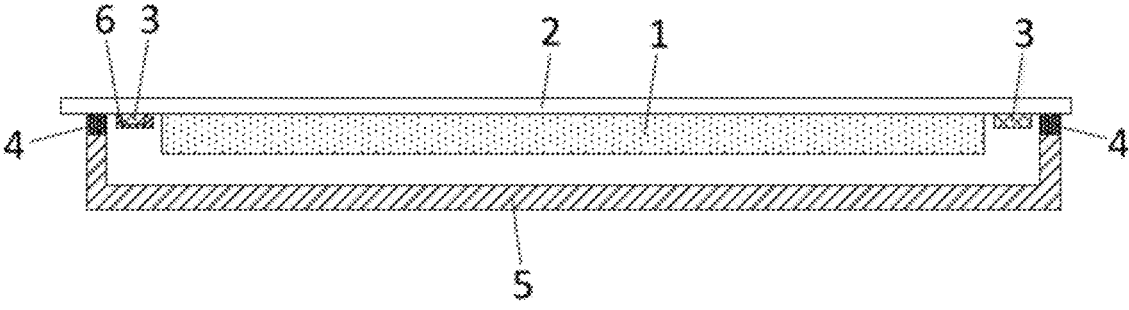
FIG. 14 is a schematic sectional view in a direction CC' in FIG. 13.

Embodiments of the present disclosure provide a haptic panel, as shown in FIG. 1 to FIG. 16. FIG. 1, FIG. 3, FIG. 4, FIG. 5, FIG. 7, FIG. 8, FIG. 9, FIG. 11, FIG. 12, FIG. 13, FIG. 15 and FIG. 16 are respectively schematic plan views of the haptic panel. FIG. 2 is a schematic sectional view in a direction CC' in FIG. 1. FIG. 6 is a schematic sectional view in a direction CC' in FIG. 5. FIG. 10 is a schematic sectional view in a direction CC' in FIG. 9. FIG. 14 is a schematic sectional view in a direction CC' in FIG. 13. The haptic panel includes:

a display module 1;

a cover plate 2 on a light exiting side of the display module 1, where a size of the cover plate 2 is larger than a size of the display module 1;

a plurality of piezoelectric devices 3, arranged on the same side of the cover plate 2 as the display module 1, and at least arranged on an opposite side of the display module 1;

a supporting layer 4, arranged on the same side of the cover plate 2 as the piezoelectric devices 3 and at least arranged on a side of the display module 1, where an orthographic projection of the supporting layer 4 on the cover plate 2 and orthographic projections of the piezoelectric devices 3 on the cover plate 2 do not overlap, and at least part of the supporting layer 4 has a plurality of openings 41 that disconnect the supporting layer 4; and a back frame 5, having an accommodation space for bearing the display module 1, and fixedly connected to the supporting layer 4.

According to the above haptic panel provided by the embodiments of the present disclosure, the cover plate may be excited by the piezoelectric devices to resonate at a specific frequency, and an effect of strong haptic feedback is realized. For example, a squeeze-film effect is generated between the cover plate in high-frequency vibration and a surface of a finger, and the squeeze-film effect can change a friction coefficient between the finger and a panel, thereby realizing a texture touch change; and the cover plate in low-frequency vibration interacts with the finger to realize vibration haptic feedback. In addition, by arranging the supporting layer to include the openings, a resonance frequency and vibration mode of the cover plate may be changed by adjusting strength of connection between the supporting layer and the cover plate, thus realizing strong vibration of the cover plate.

During specific implementation, for a vehicle-mounted display module, because of large mass thereof, it is difficult to generate texture haptic feedback through excitation by traditional linear motors. Therefore, in the above haptic panel provided by the embodiments of the present disclosure, as shown in FIG. 1 to FIG. 16, a structure of each piezoelectric device 3 may be a piezoelectric thin film or a piezoelectric ceramic block. By adopting the piezoelectric thin film or piezoelectric ceramic block, a voltage of the piezoelectric devices 3 may be given to directly provide vibration excitation, and through the use of a resonance frequency of some components of a screen module, the structure can be made to produce ultrasonic vibration, so that the haptic panel produces a haptic feedback effect and further adjusts the haptic feedback through the squeeze-film effect.

During specific implementation, in the above haptic panel provided by the embodiments of the present disclosure, as shown in FIG. 1 to FIG. 16, the cover plate 2 is a structure which is in direct contact with the finger or other tactile organs, and may be a cover plate on a surface of a display module of a notebook computer, a cover plate on a surface of a vehicle-mounted display module, a cover plate on a surface of a display module of a mobile terminal, or a cover plate on a surface of a display module in other application scenarios.

During specific implementation, in the above haptic panel provided by the embodiments of the present disclosure, as shown in FIG. 1, FIG. 3, FIG. 4, FIG. 5, FIG. 7, FIG. 8, FIG. 9, FIG. 11, FIG. 12, FIG. 13, FIG. 15 and FIG. 16, the supporting layer 4 may be arranged surrounding the display module 1, and at least a region of the supporting layer 4 adjacent to the piezoelectric devices 3 has a plurality of openings 41. In this way, on one hand, the strength of connection between the supporting layer 4 and the cover plate 2 may be freely adjusted by arranging the supporting layer 4 with a large area to change the resonance frequency and vibration mode of the cover plate 2, so as to realize strong vibration of the cover plate 2; and on the other hand, at least a region of the supporting layer 4 adjacent to the piezoelectric devices 3 has the plurality of openings 41, and first electrodes and second electrodes of the piezoelectric devices 3 may be easily led out to a printed circuit board on an outer side of the back frame 5 through the openings 41 nearby via a flexible printed board (an introduction will be given below), thus realizing transmission of an electric signal.

Figure 3:
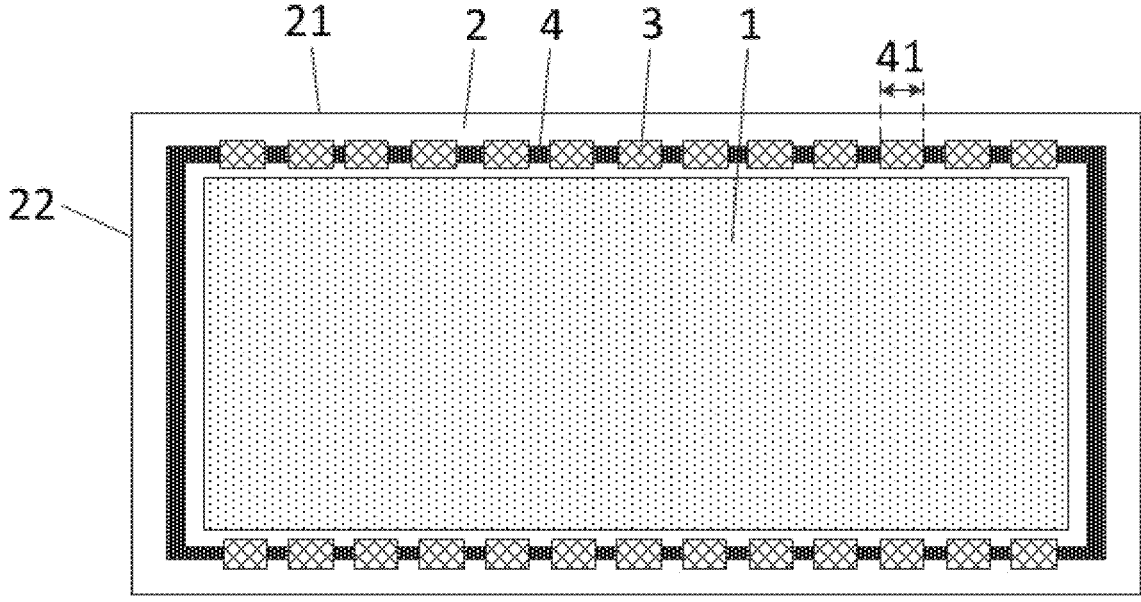
FIG. 3 is a schematic plan view of a haptic panel provided by an embodiment of the present disclosure.
Figure 7:
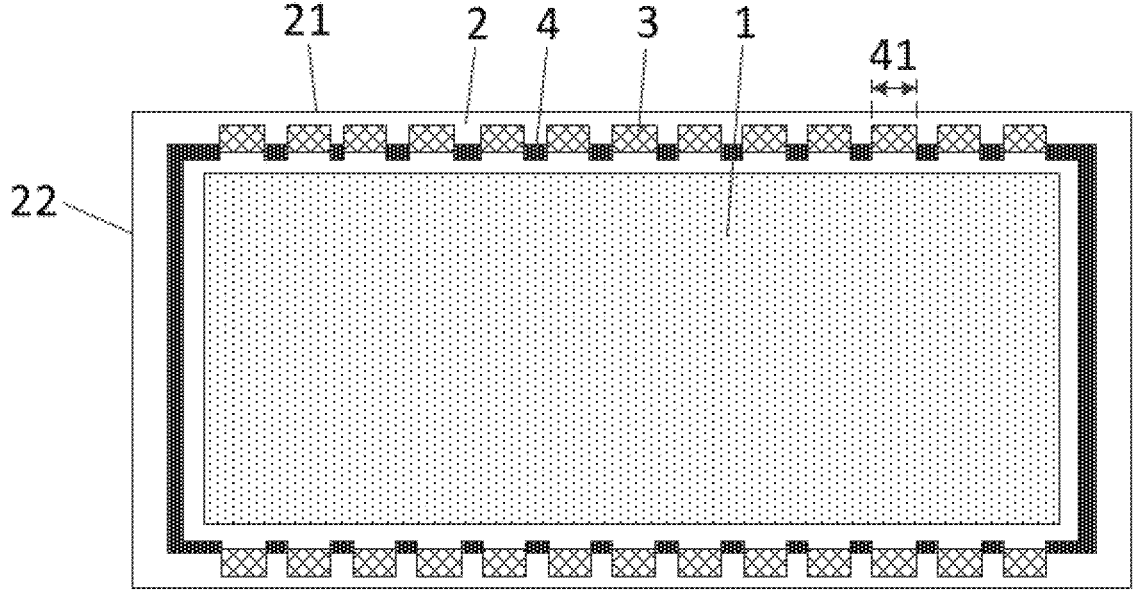
FIG. 7 is a schematic plan view of a haptic panel provided by an embodiment of the present disclosure.
Figures 11, 12:
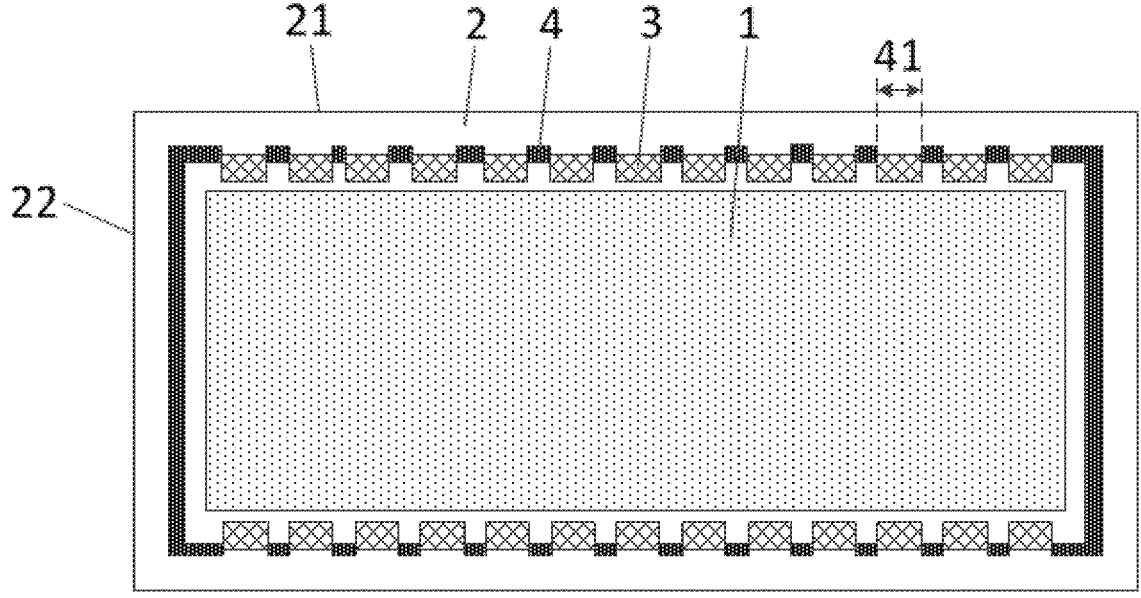
FIG. 11 is a schematic plan view of a haptic panel provided by an embodiment of the present disclosure.
FIG. 12 is a schematic plan view of a haptic panel provided by an embodiment of the present disclosure.
Figure 15:
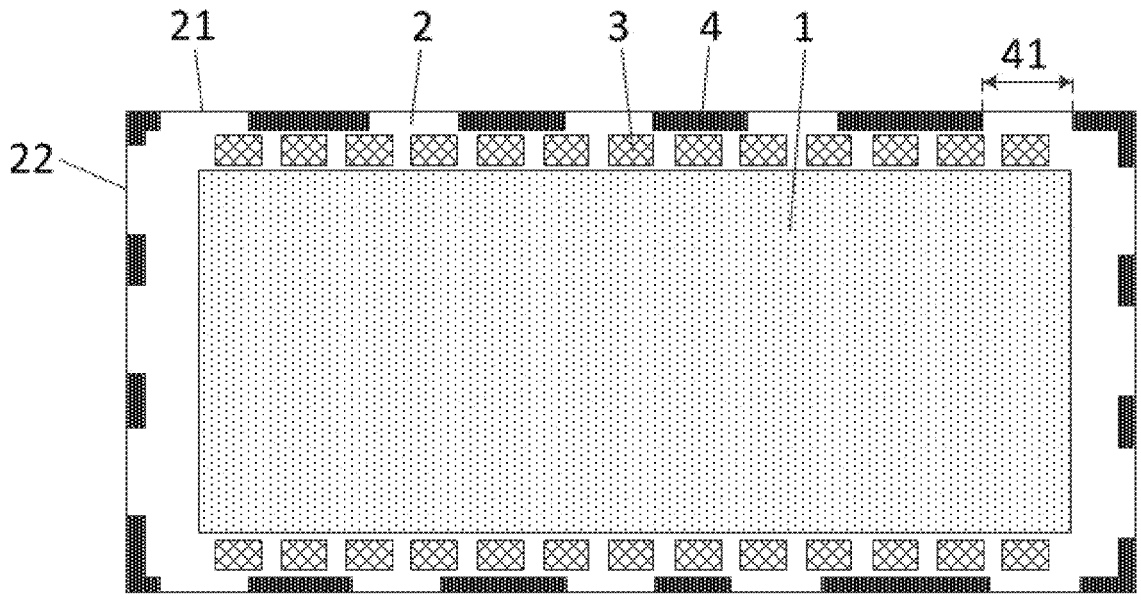
FIG. 15 is a schematic plan view of a haptic panel provided by an embodiment of the present disclosure.

During specific implementation, in the above haptic panel provided by the embodiments of the present disclosure, as shown in FIG. 3, FIG. 7. FIG. 11 and FIG. 15, the cover plate 2 has a pair of long edges 21 which are arranged opposite to each other and a pair of short edges 22 connected with the pair of long edges 21. For the haptic panel which only needs to excite the long edges 21 of the cover plate 2 to generate vibration, the piezoelectric devices 3 may be arranged only on sides close to the pair of long edges 21 of the cover plate 2. In this way, the number of the piezoelectric devices 3 may be reduced, and cost and energy consumption may be lowered.

Figure 4:
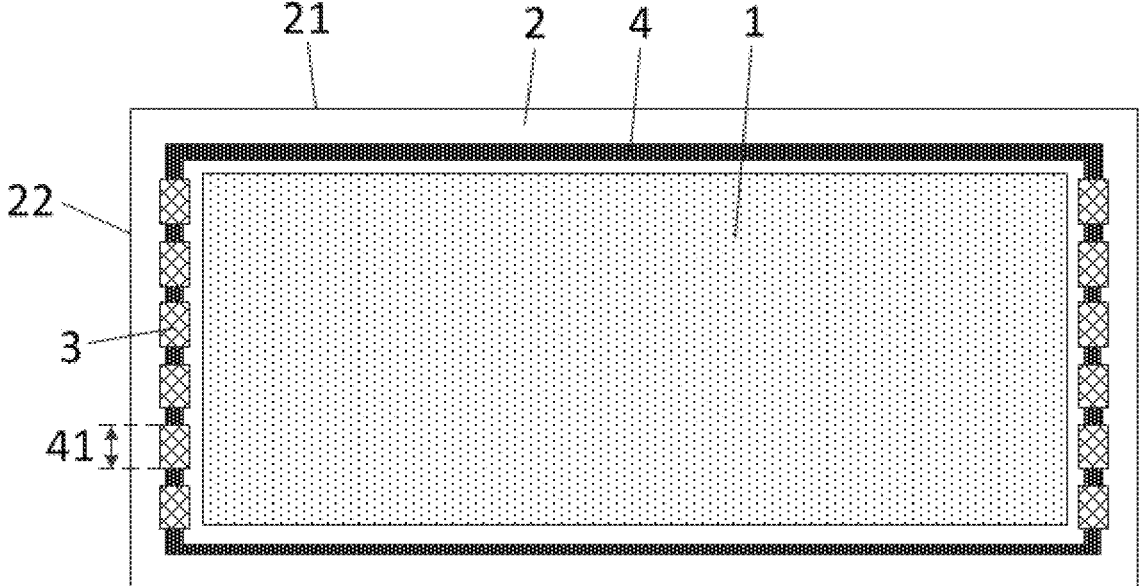
FIG. 4 is a schematic plan view of a haptic panel provided by an embodiment of the present disclosure.
Figure 5:
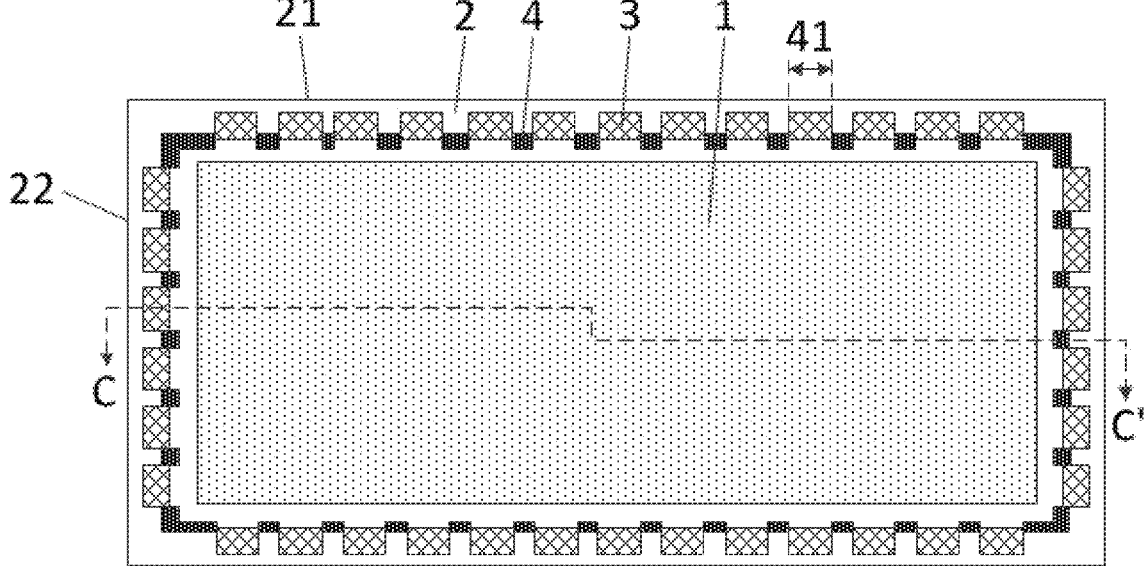
FIG. 5 is a schematic plan view of a haptic panel provided by an embodiment of the present disclosure.
Figure 6:
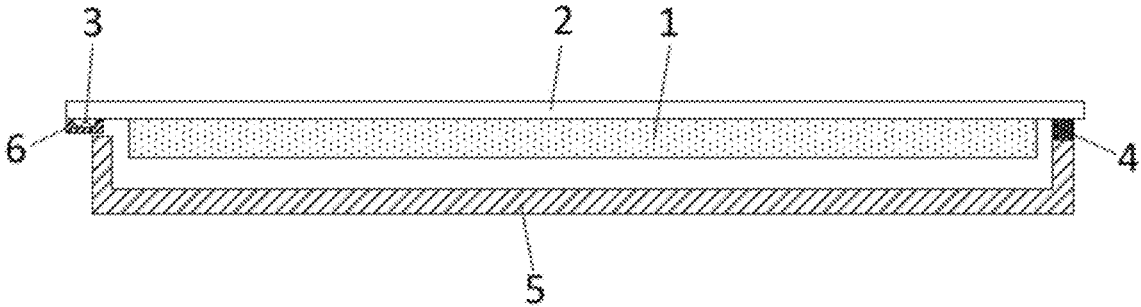
FIG. 6 is a schematic sectional view in a direction CC' in FIG. 5.
Figure 16:
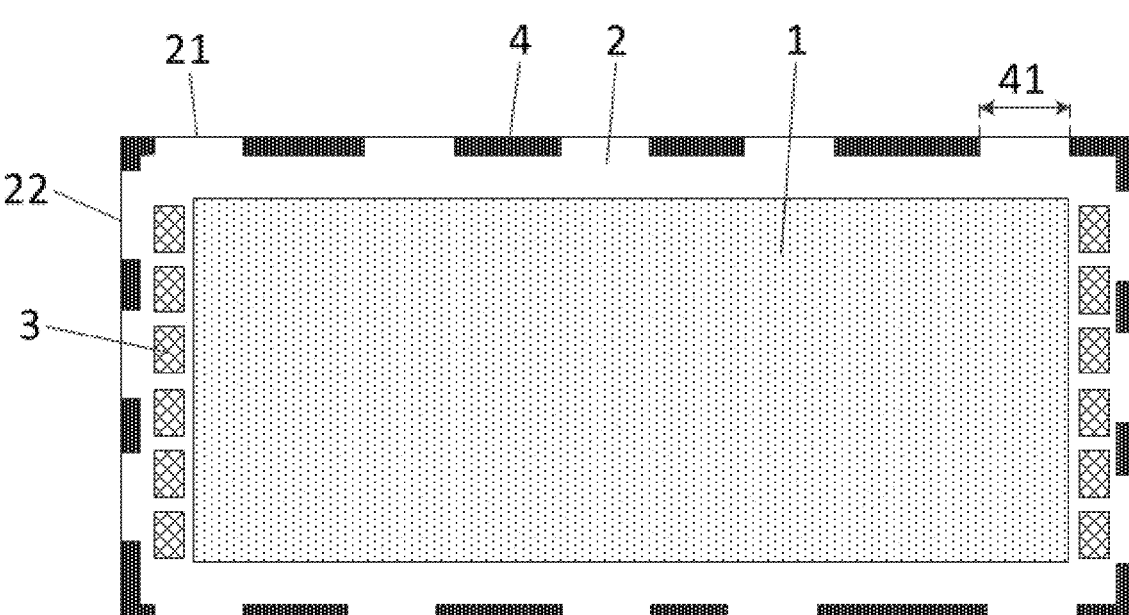
FIG. 16 is a schematic plan view of a haptic panel provided by an embodiment of the present disclosure.

During specific implementation, in the above haptic panel provided by the embodiments of the present disclosure, as shown in FIG. 4, FIG. 5. FIG. 8, FIG. 12 and FIG. 16, the cover plate 2 has a pair of long edges 21 which are arranged opposite to each other and a pair of short edges 22 connected with the pair of long edges 21. For a haptic panel which only needs to excite the short edges 22 of the cover plate 2 to generate vibration, the piezoelectric devices 3 may be arranged only on sides close to the pair of short edges 22 of the cover plate 2. In this way, the number of the piezoelectric devices 3 may be reduced, and cost and energy consumption may be lowered.

Figure 1:
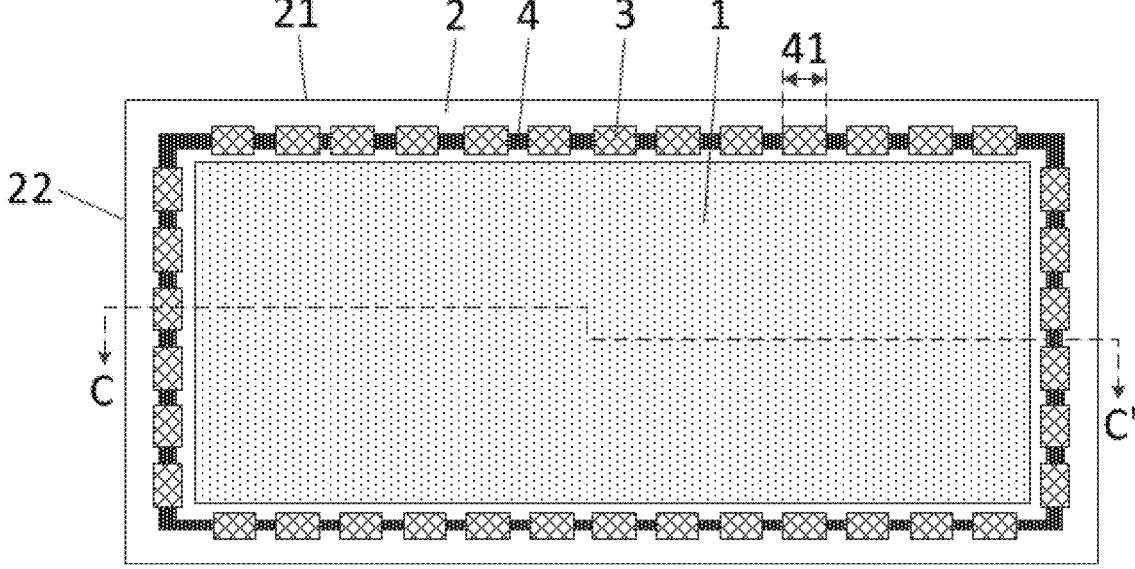
FIG. 1 is a schematic plan view of a haptic panel provided by an embodiment of the present disclosure.
Figure 2:
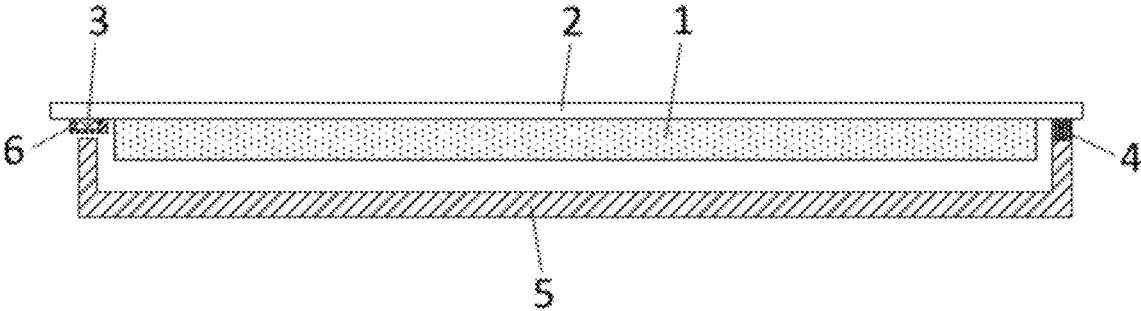
FIG. 2 is a schematic sectional view in a direction CC' in FIG. 1.

During specific implementation, in the above haptic panel provided by the embodiments of the present disclosure, as shown in FIG. 1, FIG. 3. FIG. 5, FIG. 9 and FIG. 13, for a haptic panel which needs to excite a periphery of the cover plate 2 to generate vibration, the piezoelectric devices 3 may be arranged on the periphery of the cover plate 2.

Optionally, the present disclosure may cause the cover plate to generate high-frequency resonance by adjusting an arrangement mode of the piezoelectric devices on the cover plate and realize haptic feedback adjustments through the squeeze-film effect.

During specific implementation, in order to improve a haptic feedback effect, in the above haptic panel provided by the embodiments of the present disclosure, as shown in FIG. 1, FIG. 3, FIG. 4, FIG. 5, FIG. 7, FIG. 8, FIG. 9, FIG. 11, FIG. 12, FIG. 13, FIG. 15 and FIG. 16, the piezoelectric devices 3 may be arranged at positions of a wave crest and/or a wave trough of a mechanical wave that drives the cover plate 2 to vibrate. Compared to the piezoelectric devices which are not arranged at the positions of the wave crest and the wave trough, the piezoelectric devices 3 arranged at the positions of the wave crest and the wave trough have a higher excitation efficiency. For example, under the same driving voltage, the piezoelectric devices 3 at the positions of the wave crest and the wave trough have greater vibration displacement, thus improving the haptic feedback effect.

Optionally, the piezoelectric devices in the embodiments of the present disclosure may all be arranged at the positions of the wave crest of vibration of the cover plate, or may all be arranged at the positions of the wave trough of vibration of the cover plate; or a part of the piezoelectric devices may be arranged at the positions of the wave crest of vibration of the cover plate and the other part are arranged at the positions of the wave trough of vibration of the cover plate.

Specifically, when the piezoelectric devices are arranged at the positions of both the wave crest and the wave trough, a frequency of an alternating voltage signal loaded on the piezoelectric devices at the positions of the wave crest needs to be the same as a frequency of an alternating voltage signal loaded on the piezoelectric devices at the positions of the wave trough when a haptic feedback function is realized, but a vibration effect of the cover plate along the wave crest and the wave trough may only be realized when a phase of the alternating voltage signal loaded on the piezoelectric devices at the positions of the wave crest and a phase of a alternating voltage signal loaded on the piezoelectric devices at the positions of the wave trough differ by 180°.

In practical application, firstly, an intrinsic frequency and an intrinsic vibration pattern of the cover plate may be determined through simulation (when there are a plurality of intrinsic frequencies and intrinsic vibration patterns, an intrinsic frequency and intrinsic vibration pattern with a relatively large amplitude are selected) according to parameters of the cover plate itself, such as mass, a shape, a material, etc., so as to determine the positions of the wave crest and the wave trough of vibration of the cover plate. Then the piezoelectric devices are arranged at the positions of the wave crest and/or the wave trough. Of course, the piezoelectric devices may be arranged at positions near the wave crest or wave trough according to actual needs, so that the piezoelectric devices are compatible with a variety of intrinsic vibration patterns of the cover plate. The specific positions of the piezoelectric devices on the cover plate may be adjusted according to the goal of maximizing the amplitude, which is not limited by the embodiments of the present disclosure.

During specific implementation, in the above haptic panel provided by the embodiments of the present disclosure, as shown in FIG. 1, FIG. 3, FIG. 4, FIG. 5, FIG. 7, FIG. 8, FIG. 9, FIG. 11 and FIG. 12, the openings 41 are arranged in one-to-one correspondence to the piezoelectric devices 3, a length of each opening 41 in an arrangement direction of the piezoelectric devices 3 is larger than or equal to a length of the piezoelectric device 3 in the arrangement direction of the piezoelectric devices 3, and the piezoelectric device 3 is arranged in at least part of a space of the opening 41. Through arranging piezoelectric devices 3 in at least part of the spaces of the openings 41 of the supporting layer 4, a space of the cover plate 2 on the periphery of the display module 1 occupied by the piezoelectric devices 3 and the supporting layer 4 may be reduced, and a width of the cover plate 2 on the periphery of the display module 1 may be reduced, thus reducing a frame of the haptic panel.

It should be noted that, as shown in FIG. 1, FIG. 3, FIG. 4, FIG. 5, FIG. 7, FIG. 8, FIG. 9, FIG. 11 and FIG. 12, the embodiments of the present disclosure is described by an example of the length of each opening 41 in the arrangement direction of the piezoelectric devices 3 being equal to the length of the piezoelectric device 3 in the arrangement direction of the piezoelectric devices 3. Of course, the length of each opening 41 in the arrangement direction of the piezoelectric devices 3 may also be larger than the length of the piezoelectric device 3 in the arrangement direction of the piezoelectric devices 3.

During specific implementation, in order to achieve the lowest frame of the haptic panel, and to arrange the piezoelectric devices exactly at the positions of the wave crest or wave trough of the vibration of the cover plate, the parameters of the cover plate itself, such as mass, a shape, a material, etc., may be adjusted to cause the wave crest or wave trough to be exactly at a central position of the opening. Therefore, in the above haptic panel provided by the embodiment of the present disclosure, as shown in FIG. 1, FIG. 3 and FIG. 4, a center of each piezoelectric device 3 coincides with a center of the corresponding opening 41. In this way, the space of the cover plate 2 on the periphery of the display module 1 occupied by the piezoelectric devices 3 and the supporting layer 4 may be reduced to minimum, and the piezoelectric devices 3 may be arranged at the positions of the wave crest and/or the wave trough, so that the excitation efficiency is improved, thus improving the haptic feedback effect.

During specific implementation, in order to achieve the lowest frame of the haptic panel, there is no guarantee that the piezoelectric devices can be arranged exactly at the positions of the wave crest or the wave trough of the vibration of the cover plate even though the parameters of the cover plate itself, such as mass, a shape, a material, etc., are adjusted. For example, there may be a certain deviation between the position of the wave crest or wave trough and the central position of the opening. For example, in the above haptic panel provided by the embodiments of the present disclosure, as shown in FIG. 5, FIG. 7, FIG. 8, FIG. 9, FIG. 11 and FIG. 12, an orthographic projection of the piezoelectric device 3 on the cover plate 2 and an orthographic projection of the corresponding opening 41 on the cover plate 2 have an overlapping region, and a center of the piezoelectric device 3 does not coincide with a center of the corresponding opening 41. In this way, on one hand, the space of the cover plate 2 on the periphery of the display module 1 occupied by the piezoelectric devices 3 and the supporting layer 4 may be reduced, and moreover, the piezoelectric devices 3 may be arranged at the positions of the wave crest and/or the wave trough, so that the excitation efficiency is improved, thus improving the haptic feedback effect.

Optionally, as shown in FIG. 5, FIG. 7 and FIG. 8, the wave crest or wave trough of the vibration of the cover plate 2 may be located between the center of the opening 41 and an outer side edge of the cover plate 2, so that the piezoelectric device 3 is arranged between the center of the opening 41 and the outer side edge of the cover plate 2. As shown in FIG. 9, FIG. 11 and FIG. 12, the wave crest or wave trough of the vibration of the cover plate 2 is located between the center of the opening 41 and the display module 1, so that the piezoelectric device 3 is arranged between the center of the opening 41 and the display module 1.

Optionally, as shown in FIG. 5, FIG. 7, FIG. 8, FIG. 9, FIG. 11 and FIG. 12, a distance between the center of each piezoelectric device 3 and the center of the corresponding opening 41 is determined according to actual positions of the wave crest and wave trough of the vibration of the cover plate 2.

Figure 17:
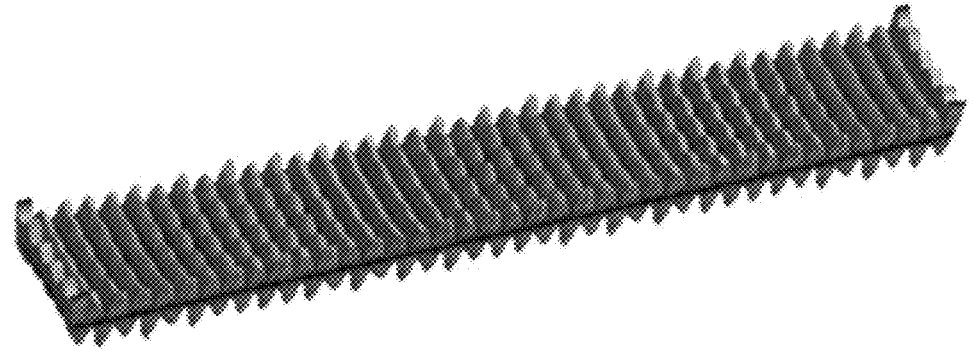
FIG. 17 is a diagram of a vibration waveform corresponding to an arrangement of piezoelectric devices on sides of a pair of short edges of a cover plate.
Figure 18:
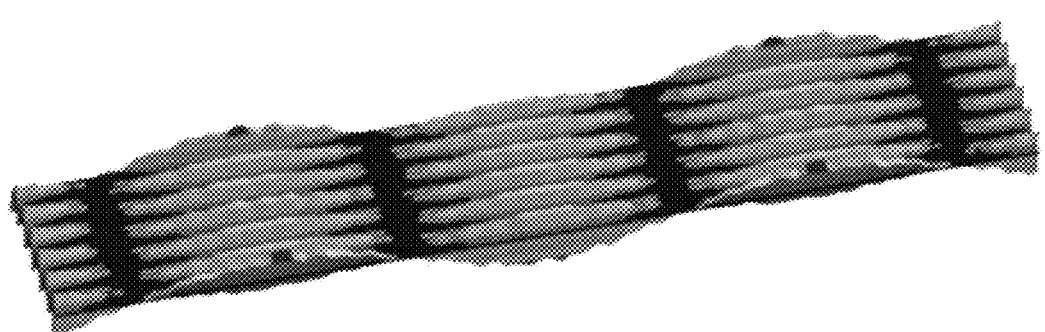
FIG. 18 is a diagram of a vibration waveform corresponding to an arrangement of piezoelectric devices on sides of a pair of long edges of a cover plate.

As shown in FIG. 17, which is a diagram of a vibration waveform corresponding to an arrangement of the piezoelectric devices on the sides close to a pair of short edges of the cover plate, in this way, centers of piezoelectric devices on the sides of the short edges should correspond to the positions of the wave crest or wave trough in FIG. 17. As shown in FIG. 18, which is a diagram of a vibration waveform corresponding to an arrangement of the piezoelectric devices on the sides close to a pair of long edges of the cover plate, in this way, centers of piezoelectric devices on the sides of the long edges should correspond to the positions of the wave crest or wave trough in FIG. 18.

During specific implementation, as shown in FIG. 1 to FIG. 12, the above haptic panel provided by the embodiments of the present disclosure further includes a protective layer 6 on a side of various piezoelectric devices 3 facing away from the cover plate 2. The protective layer 6 is not shown in FIG. 1, FIG. 3, FIG. 4, FIG. 5, FIG. 7, FIG. 8, FIG. 9, FIG. 11 and FIG. 12. The protective layer 6 covers a surface of the piezoelectric device 3 facing away from cover plate 2 and covers a side surface of the piezoelectric device 3 which is not in contact with the supporting layer 4, and the protective layer 6 is in contact with the cover plate 2. In this way, the protective layer 6 may seal the piezoelectric devices 3 between the protective layer 6 and the cover plate 2, the piezoelectric devices 3 may be isolated from contact with external air, and high humidity resistance of the haptic panel is improved.

During specific implementation, because the supporting layer mainly plays the role of connecting the cover plate and the back frame, in the above haptic panel provided by the embodiments of the present disclosure, as shown in FIG. 2, FIG. 6 and FIG. 10, a thickness of the supporting layer 4 is larger than a maximum thickness of the protective layer 6. In this way, the back frame 5 may be in close contact with the supporting layer 4.

Optionally, in the above haptic panel provided by the embodiments of the present disclosure, a material of the supporting layer may include but is not limited to at least one of rubber, foam, sponge, or polydimethylsiloxane (PDMS). These materials may achieve good fixed connection between the cover plate and the back frame.

During specific implementation, in the above haptic panel provided by the embodiments of the present disclosure, as shown in FIG. 13 to FIG. 16, all side edges of the supporting layer 4 have a plurality of openings 41 that disconnect the supporting layer 4. The wave crest or the wave trough of the vibration of the cover plate 2 is probably located between the supporting layer 4 and the display module 1, and in this way, the piezoelectric devices 3 are arranged between the supporting layer 4 and the display module 1, so that the piezoelectric devices 3 are arranged at the positions of the wave crest or the wave trough of the vibration of the cover plate 2. Furthermore, through the arrangement of the piezoelectric devices 3 between the supporting layer 4 and the display module 1, the piezoelectric devices 3 are located in a sealed space formed by the back frame 5 and the supporting layer 4, so that the piezoelectric device 3 may be further isolated from contact with external air, and high humidity resistance of the haptic panel is further improved.

During specific implementation, in the above haptic panel provided by the embodiment of the present disclosure, as shown in FIG. 13, FIG. 15 and FIG. 16, the number of the openings 41 in each side edge of the supporting layer 4 may be smaller than the number of the piezoelectric devices 3, which is not limited to this.

During specific implementation, as shown in FIG. 13 to FIG. 16, the above haptic panel provided by the embodiments of the present disclosure further includes a protective layer 6 on a side of the piezoelectric devices 3 facing away from the cover plate 2. The protective layer 6 is not shown in FIG. 13, FIG. 15 and FIG. 16. The protective layer 6 covers a surface of the piezoelectric device 3 facing away from the cover plate 2 and covers a side surface of the piezoelectric device 3, and the protective layer 6 is a closed annulus surrounding the display module 1. In this way, the protective layer 6 may seal the piezoelectric devices 3 between the protective layer 6 and the cover plate 2, the piezoelectric devices 3 may be isolated from contact with external air, high humidity resistance of the haptic panel is improved, and the protective layer 6 of a closed annular structure may simplify a manufacturing process of the protective layer 6.

Optionally, a material of the protective layer may include but is not limited to green oil or tri-proof paint.

During specific implementation, in the above haptic panel provided by the embodiment of the present disclosure, as shown in FIG. 1 to FIG. 16, the display module 1 may include a display panel and a back light which are laminated on a side of the cover plate 2 facing the back frame 5. The display panel is a vehicle-mounted liquid crystal display panel. In the present disclosure, by adopting the piezoelectric thin film or piezoelectric ceramic block, the voltage of the piezoelectric devices 3 may be given to directly provide vibration excitation, and through the use of a resonance frequency of some components of a screen module, the structure can be made to produce ultrasonic vibration, so that the haptic panel produces a haptic feedback effect and further adjusts the haptic feedback through the squeeze-film effect.

It should be noted that, the display panel and back light in the display module provided by the embodiments of the present disclosure have the same structure as those in the prior art, and repetition is not made here.

During specific implementation, in the above haptic panel provided by the embodiments of the present disclosure, as shown in FIG. 1 to FIG. 16, each piezoelectric device 3 may include a first electrode, a piezoelectric layer and a second electrode which are laminated, the first electrodes of all piezoelectric devices 3 are all grounded, the second electrodes of the piezoelectric devices 3 located on the same side of the display module 1 may be electrically connected with the same driving voltage end, and the second electrodes of the piezoelectric devices 3 located on different sides of the display module 1 may be electrically connected with different driving voltage ends. In this way, all piezoelectric devices 3 on the same side of the display module 1 may be driven as a whole, and energy consumption may be lowered.

Optionally, the embodiments of the present disclosure may further independently drive each piezoelectric device respectively, or all piezoelectric devices on the cover plate may be driven as a whole, which is selected according to actual needs.

During specific implementation, for example, a grounding voltage signal may be applied to the first electrode, and an alternating voltage signal may be applied to the second electrode, so that an alternating electric field may be formed between the first electrode and the second electrode, and a frequency of the alternating electric field is the same as a frequency of the alternating voltage signal. Under an action of the alternating electric field, the piezoelectric layer under-goes deformation and generates a vibration signal, and a frequency of the vibration signal is the same as the frequency of the alternating electric field. When the frequency of the vibration signal is close to or equal to the intrinsic frequency of the cover plate, the cover plate resonates, a vibration amplitude is increased, and a haptic feedback signal is generated. When the finger touches the surface of the cover plate, a change of friction may be clearly sensed. In practical application, the friction on the surface may be adjusted by resonance generated between the piezoelectric layer and the cover plate, and therefore reproduction of texture of an object is realized on the surface of the cover plate.

During specific implementation, in the above haptic panel provided by the embodiments of the present disclosure, a material of the first electrode may be a transparent material. For example, the material of the first electrode may include at least one of indium tin oxide (ITO), indium zinc oxide (IZO), indium gallium zinc oxide (IGZO) or aluminum zinc oxide (AZO).

During specific implementation, a material of the second electrode is usually ITO, but no limitation is made here.

Of course, during specific implementation, without consideration of a transmittance of a device, the first electrode and the second electrode may also be made of one of titanium-gold (Ti—Au) alloy, titanium-aluminum-titanium (Ti—Al—Ti) alloy, or titanium-molybdenum (Ti—Mo) alloy. Moreover, the first electrode and the second electrode may also be made of one of titanium (Ti), gold (Au), silver (Ag), molybdenum (Mo), copper (Cu), tungsten (W), or chrome (Cr). Those skilled in the art may arrange the above first electrode and second electrode according to actual needs, which is not limited here.

During specific implementation, as shown in FIG. 1 to FIG. 16, the above haptic panel provided by the embodiments of the present disclosure further includes: a flexible printed circuit (FPC, not shown) arranged within the back frame 5 and electrically connected with the display module 1, and a printed circuit board (PCB, not shown) arranged on an outer side of the back frame 5. The first electrodes and second electrodes of the piezoelectric devices 3 are electrically connected with the flexible printed board respectively, and the flexible printed board is electrically connected with the printed circuit board through the opening 41. In this way, the first electrodes and second electrodes of the piezoelectric devices 3 are led out to the printed circuit board on the outer side of the back frame 5 via the flexible printed board, thus realizing transmission of an electric signal.

The haptic panel provided by the embodiments of the present disclosure is not limited to application to a vehicle-mounted module, and may also be applied to the fields of medical treatment, automotive electronics, motion tracking systems, and so on. It is particularly suitable for application in the field of wearable devices, medical in vitro or implanted inside a human body for monitoring and therapeutic use, or application in the field of such as electronic skin for artificial intelligence. Specifically, the haptic panel may be applied to apparatuses that may generate vibration and mechanical properties, such as vehicles, brake pads, keyboards, mobile terminals, gamepads, and the like.

Based on the same inventive concept, an embodiment of the present disclosure further provides a display apparatus, including the above haptic panel provided by the embodiments of the present disclosure. A problem-solving principle of the display apparatus is similar to that of the above haptic panel, so for implementation of the display apparatus, reference may be made to implementation of the above haptic panel, and repetition is omitted. The display apparatus may be a vehicle-mounted display apparatus.

During specific implementation, the above display apparatus provided by the embodiments of the present disclosure may further include other functional structures known to those skilled in the art, and detail description is omitted here.

The embodiments of the present disclosure provide a haptic panel and a display apparatus. The cover plate may be excited by the piezoelectric devices to resonate at a specific frequency, and an effect of strong haptic feedback is realized. For example, a squeeze-film effect is generated between the cover plate in high-frequency vibration and a surface of a finger, and the squeeze-film effect can change a friction coefficient between the finger and a panel, thereby realizing a texture touch change; and the cover plate in low-frequency vibration interacts with the finger to realize vibration haptic feedback. In addition, by arranging the supporting layer to include the openings, a resonance frequency and vibration mode of the cover plate may be changed by adjusting strength of connection between the supporting layer and the cover plate, thus realizing strong vibration of the cover plate.

Although the preferred embodiments of the present disclosure have been described, those skilled in the art can make additional changes and modifications on these embodiments once they know the basic creative concept. So, the appended claims are intended to be construed to include the preferred embodiments and all changes and modifications that fall into the scope of the present disclosure.

Apparently, those skilled in the art may perform various modifications and variations on the embodiments of the present disclosure without departing from the spirit and scope of the embodiments of the present disclosure. In this way, if these modifications and variations on the embodiments of the present disclosure fall in the scope of the claims of the present disclosure and their equivalent technologies, the present disclosure is also intended to include these modifications and variations.

What is claimed is:

1. A haptic panel, comprising:
a display module;
a cover plate on a light exiting side of the display module, wherein a size of the cover plate is larger than a size of the display module;
a plurality of piezoelectric devices, arranged on a same side of the cover plate as the display module, and at least arranged on an opposite side of the display module;
a supporting layer, arranged on a same side of the cover plate as the plurality of piezoelectric devices and at least arranged on a side of the display module, wherein an orthographic projection of the supporting layer on the cover plate and orthographic projections of the plurality of piezoelectric devices on the cover plate do not overlap, and at least part of the supporting layer has a plurality of openings that disconnect the supporting layer; and
a back frame, having an accommodation space for bearing the display module, and fixedly connected to the supporting layer.

2. The haptic panel according to claim 1, wherein the supporting layer is arranged surrounding the display module, and at least a region of the supporting layer adjacent to the plurality of piezoelectric devices has the plurality of openings.

3. The haptic panel according to claim 2, wherein the cover plate has a pair of long edges which are arranged opposite to each other and a pair of short edges connected with the pair of long edges; and the plurality of piezoelectric devices are arranged on sides close to the pair of long edges of the cover plate.

4. The haptic panel according to claim 2, wherein the cover plate has a pair of long edges which are arranged opposite to each other and a pair of short edges connected with the pair of long edges; and the plurality of piezoelectric devices are arranged on sides close to the pair of short edges of the cover plate;

wherein the plurality of piezoelectric devices are arranged on a periphery of the cover plate.

5. The haptic panel according to claim 2, wherein the plurality of openings are arranged in one-to-one correspondence to the plurality of piezoelectric devices;

a length of each opening in an arrangement direction of the piezoelectric devices is larger than or equal to a length of the piezoelectric device in the arrangement direction of the piezoelectric devices; and the piezoelectric device is arranged in at least part of a space of the opening.

6. The haptic panel according to claim 5, wherein a center of the piezoelectric device coincides with a center of a corresponding opening.

7. The haptic panel according to claim 5, wherein an orthographic projection of the piezoelectric device on the cover plate and an orthographic projection of a corresponding opening on the cover plate have an overlapping region; and a center of the piezoelectric device does not coincide with a center of the corresponding opening.

8. The haptic panel according to claim 5, further comprising a protective layer on a side of the plurality of piezoelectric devices facing away from the cover plate;

wherein the protective layer covers a surface of the piezoelectric device facing away from the cover plate and covers a side surface of the piezoelectric device not in contact with the supporting layer; and the protective layer is in contact with the cover plate.

9. The haptic panel according to claim 8, wherein a thickness of the supporting layer is larger than a maximum thickness of the protective layer.

10. The haptic panel according to claim 2, wherein all side edges of the supporting layer have a plurality of openings that disconnect the supporting layer; and the plurality of piezoelectric devices are arranged between the supporting layer and the display module;

wherein a quantity of the openings in each of the side edges of the supporting layer is smaller than a quantity of the piezoelectric devices.

11. The haptic panel according to claim 10, further comprising a protective layer on a side of the plurality of piezoelectric devices facing away from the cover plate;

wherein the protective layer covers a surface of the piezoelectric device facing away from the cover plate and covers a side surface of the piezoelectric device; and the protective layer is a closed annulus surrounding the display module.

12. The haptic panel according to claim 8, wherein a material of the protective layer comprises green oil or tri-proof paint.

13. The haptic panel according to claim 1, wherein the piezoelectric devices are arranged at positions of a wave crest and/or a wave trough of a mechanical wave that drives the cover plate to vibrate.

14. The haptic panel according to claim 1, wherein a material of the supporting layer comprises at least one of rubber, foam, sponge, or polydimethylsiloxane.

15. The haptic panel according to claim 1, wherein the display module comprises a display panel and back light which are laminated on a side of the cover plate facing the back frame.

16. The haptic panel according to claim 1, wherein each of the plurality of piezoelectric devices comprises a first electrode, a piezoelectric layer and a second electrode which are laminated;

wherein first electrodes of all the piezoelectric devices are grounded;

second electrodes of the piezoelectric devices located on a same side of the display module are electrically connected with a same driving voltage end; and second electrodes of the piezoelectric devices located on different sides of the display module are electrically connected with different driving voltage ends.

17. The haptic panel according to claim 1, further comprising:

a flexible printed board arranged within the back frame and electrically connected with the display module; and a printed circuit board on an outer side of the back frame;

wherein the first electrode and second electrode of the piezoelectric device are electrically connected with the flexible printed board respectively, and the flexible printed board is electrically connected with the printed circuit board through the opening.

18. The haptic panel according to claim 1, wherein a structure of each of the plurality of piezoelectric devices is a piezoelectric thin film or a piezoelectric ceramic block.

19. The haptic panel according to claim 1, wherein the cover plate comprises a cover plate on a surface of a display module of a notebook computer, a cover plate on a surface of a vehicle-mounted display module, or a cover plate on a surface of a display module of a mobile terminal.

20. A display apparatus, comprising the haptic panel according to claim 1.

\* \* \* \* \*